United States Patent [19]
Guillory et al.

[11] Patent Number: 5,306,905
[45] Date of Patent: Apr. 26, 1994

[54] METHOD FOR MINIMIZING 1/F AND OTHER LOW FREQUENCY NOISE IN SIGNAL PROCESSING FOR FOCAL PLANE ARRAY DETECTOR SYSTEM

[75] Inventors: Michael R. Guillory, Denton; Michael R. Kay, Dallas; Robert M. Stokes, The Colony, all of Tex.

[73] Assignee: Texas Instruments Incorporated, Dallas, Tex.

[21] Appl. No.: 936,690

[22] Filed: Aug. 27, 1992

[51] Int. Cl.$^5$ ............................... H01J 40/14
[52] U.S. Cl. .................... 250/208.1; 348/241
[58] Field of Search .............. 250/208.1, 208.2, 208.3, 250/208.5; 358/213.11, 213.15, 213.31, 212, 213.16

[56] References Cited

U.S. PATENT DOCUMENTS 5,162,912 11/1992 Ueno et al. ............... 358/213.15 X
5,182,446 1/1993 Tew ................................ 250/208.1

Primary Examiner—David C. Nelms
Assistant Examiner—John R. Lee
Attorney, Agent, or Firm—René E. Grossman; Richard L. Donaldson

[57] ABSTRACT

A focal plane array detector method and system and the detector circuit comprising a plurality of detector circuits, each of the detector circuits comprising a first capacitor having upstream and downstream electrodes, circuitry for periodically applying a predetermined constant voltage source to the downstream electrode and then removing the constant voltage source from the downstream electrode, a photodetector for applying an input signal to the upstream electrode, a signal storage device for storing the input signal on the downstream electrode at the first capacitor and a coupling device for periodically coupling the signal storage device to and uncoupling the signal storage device from the downstream electrode a predetermined time after the constant voltage source has been removed from the upstream electrode and a multiplex circuit coupled to each of the signal storage devices for providing a serial output of the signals stored on the signal storage devices. The system is disposed on a single semiconductor chip.

16 Claims, 2 Drawing Sheets

METHOD FOR MINIMIZING 1/F AND OTHER LOW FREQUENCY NOISE IN SIGNAL PROCESSING FOR FOCAL PLANE ARRAY DETECTOR SYSTEM

BACKGROUND OF THE INVENTION

1. Field of the Invention

This invention relates to a noise reduction circuit in a signal processing channel, primarily for use in conjunction with a focal plane array (FPA) and, more specifically, to a noise reduction system for minimizing 1/f and other low frequency noise as well as errors caused by ambient low frequency magnetic fields. This invention also corrects for DC non-uniformities in the input signals (i.e., photodetectors).

2. Brief Description of the Prior Art

In accordance with the prior art focal plane array (FPA) detector systems, there is generally provided a plurality of photodetectors in an array, the output of each of the photodetectors being fed to an associated amplifier, the amplified output thereof being passed to a multiplexing circuit. The outputs, which are fed to the multiplexing circuit of the system, are serially read out to a post amplifier and are then fed to a bond pad on the single chip containing the entire circuit.

Certain scanning focal plane arrays have been found to encounter a significant low frequency magnetic field. This low frequency magnetic field causes considerable low frequency electrical voltages to be generated in the CMOS circuits and detectors which can be of sufficient magnitude to dwarf the relatively high frequency signal coming from the detectors of the FPA. Also, the CMOS circuitry and detectors produce significant low frequency 1/f noise which also degrades the signal to noise ratio. Little, if any, consideration was given to these low frequency noise components in the prior art systems of the above described type.

SUMMARY OF THE INVENTION

In accordance with the present invention, there is provided a focal plane array detector system as in the prior art along with a signal processor in each of the circuits associated with each photodetector for use in conjunction with the associated photodetector of the focal plane array (FPA). The signal processor processes and amplifies the signal received from the photodetector with subsequent multiplexing of the processed signal along with similar signals from other such circuits. The resulting serial signals are then read off the chip. The entire processing, amplifying and multiplexing system is preferably disposed on a single semiconductor chip. The purpose of the signal processor in accordance with the present invention is to improve the signal to noise ratio of the signal exiting the semiconductor chip.

For each clock cycle of operation of each circuit of the system, the system output for each photodetector will be a function of the change in the signal received from the photodetector relative to the prior signal received from the same photodetector circuit. Therefore, if the input from a particular photodetector is constant, the output for that photodetector will be zero, whereas if the input increases between two cycles, the output will be positive by the amount of change and if the input decreases between cycles, the output will be negative by the amount of change. Accordingly, the output is essentially the time derivative of the input signal. This eliminates a problem caused by having nonuniform impedance among the photodetectors (which is generally the case) since actual input values are of much less importance than the actual change in input values from cycle to cycle, thereby eliminating the prior art requirement of tailoring each amplifier in each circuit of the system to the signal level of its associated photodetector. Furthermore, the prior art amplifier tailoring has to be accomplished off chip, thereby adding to the size of the system and precluding the ability to place the entire circuit on a single semiconductor chip.

The circuit provides an output which is only the difference in detected signal between the current cycle and the immediately prior cycle of operation by providing a clamp capacitor in series with the detector and the input to the multiplexer circuit. The current signal is initially impressed across the clamp capacitor during a first cycle whereupon, at the end of the first cycle, a predetermined voltage is applied to the downstream electrode of the capacitor, causing said downstream electrode to revert to the predetermined voltage. At the next cycle, when the next signal from the detector is impressed across the clamp capacitor, the voltage thereacross will be based upon the actual value of the signal from the detector minus the predetermined voltage. It follows that, for each cycle, only the difference from the predetermined voltage is stored and sent to the multiplexer for output.

The system in accordance with the present invention also acts as an adaptable spatial bandpass filter rejecting low spatial frequencies when used in conjunction with an imaging system. The actual band of frequencies being filtered is a function of the line rate and frame rate. Therefore the bandpassed region of the curve can be shifted up or down in frequency range by changing the operating frequency. The filtering system is used to attenuate 1/f noise, low frequency magnetic noise and 1/f² scene spectrum.

In summary, there are two basic advantages of reading the data off the focal plane in differential format as described above. A first such advantage is compensation for non-uniformity in the detectors, this currently being one of the greatest limitations of focal planes, the concept herein eliminating DC non-uniformities in the detectors. A second such advantage relates to the attenuation of low frequency noise which is found in three varieties, these being (1) 1/f noise in CMOS and MCT, (2) 1/f² scene spectrum and (3) near-by low frequency magnetic noise from spinning motors. Currently, little or nothing is done to compensate for these problems which represent limitations to the overall performance of a focal plane array system.

DESCRIPTION OF THE PREFERRED EMBODIMENT

Figure 1:
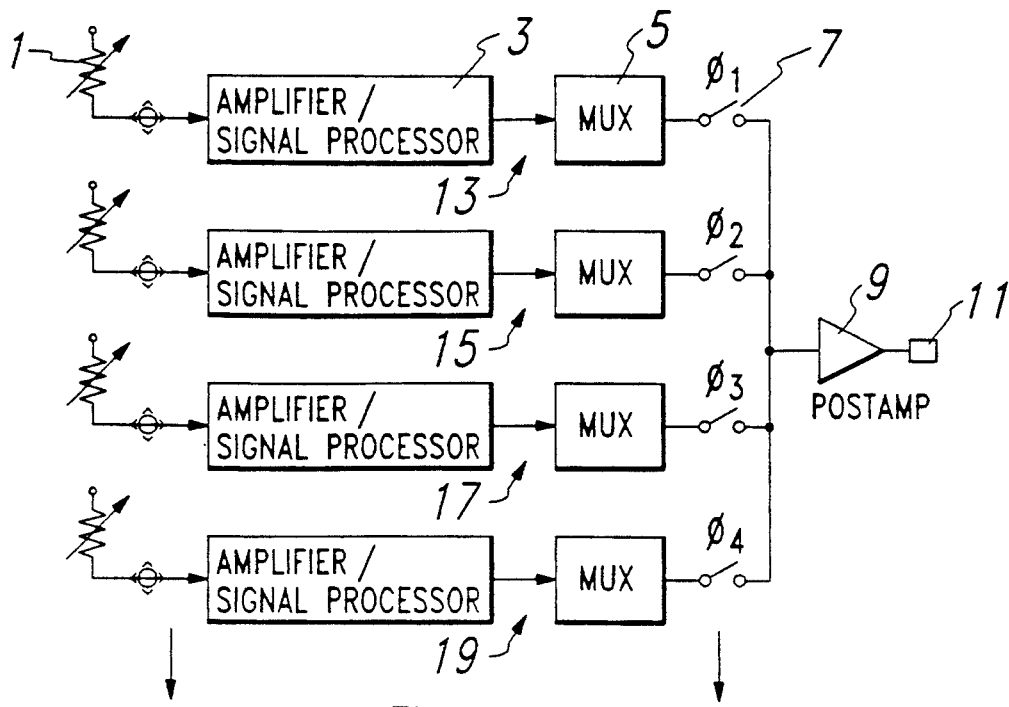
FIG. 1 is a block diagram of a focal plane array detector system using an amplifier/signal processing circuit in accordance with the present invention.

Referring now to FIG. 1, there is shown a block diagram of a focal plane array detector system. The system includes a plurality of photodetectors 1, the output of each of the photodetectors being fed to an associated amplifier/signal processor circuit 3, the output of which is passed to a multiplexing circuit 5, preferably but not necessarily of the type set forth in copending application Ser. No. 07/936,169, filed Aug. 27, 1992 of Michael R. Kay, the contents of which are incorporated herein by reference. The outputs of the multiplexing circuits 5 are serially read out to a post amplifier 9 and then to a bond pad 11 on the single chip by serially opening and closing the switches 7 of each of the individual photodetector circuits 13, 15, 17, 19 in standard manner. In a standard FPA system, there could be, for example, 240 such photodetector circuits 13, 15, 17, 19, this number being arbitrary. All of the circuitry shown in FIG. 1 including the photodetectors 1 is disposed on a single semiconductor chip.

Figure 2:
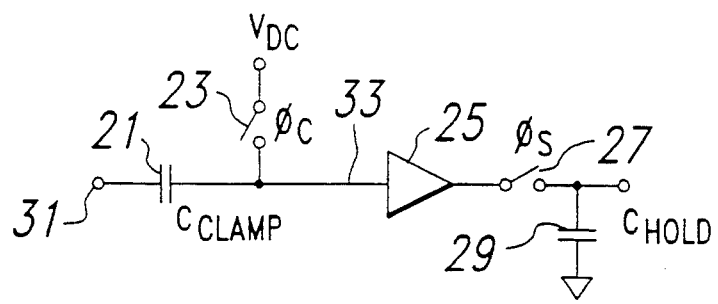
FIG. 2 is a circuit diagram of the amplifier/signal processing circuit of FIGURE in accordance with the present invention.

Referring now to FIG. 2, there is shown a circuit diagram of a typical individual one of the amplifier/signal processor circuits 3 of FIG. 1, all of which are substantially identical, in accordance with the present invention though, as stated above, each of the photodetectors 1 themselves may provide a slightly different output signal for the identical input. A photoconductor 1 (shown in FIG. 1) feeds a signal into the amplifier/processor circuit 3 in response to the impingement of infrared radiations thereon. The amplifier/signal processor 3 includes a clamp capacitor 21 in series with the photodetector 1 which is charged during each cycle in accordance with the signal provided from the photodetector 1. The voltage from source $V_{DC}$, which is a predetermined fixed voltage, is applied to the downstream electrode of the capacitor 21 when switch 23 is closed. The voltage on node 33, which is the downstream electrode of capacitor 21, is amplified by operational amplifier 25 and applied to hold capacitor 29 when the switch 27 is closed. The signal on the hold capacitor 29 is retained for transfer by the multiplex circuit 5 of FIG. 1 as discussed above and in standard manner.

Figure 3:
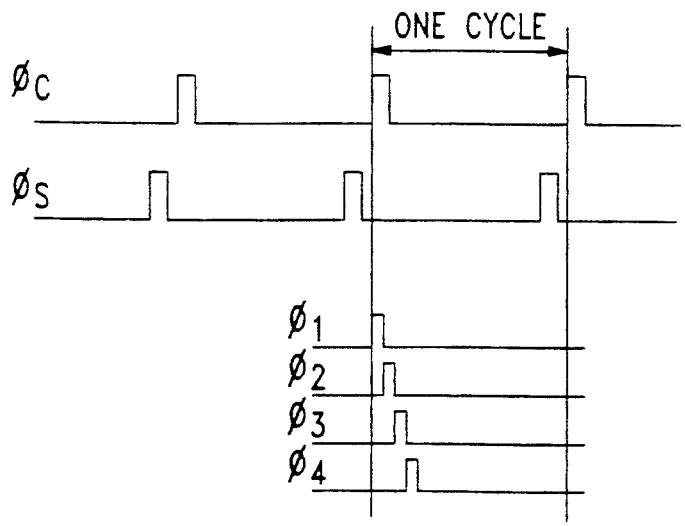
FIG. 3 is a timing diagram for the circuit of FIG. 2.

In operation, and with reference to FIG. 3, it is assumed for the purposes of simplicity that the input from the detector is a triangular wave since the derivative thereof is a square wave. It is also assumed for simplicity that $V_{DC}$ is zero, though in practice this voltage would probably not be zero.

Figure 4:
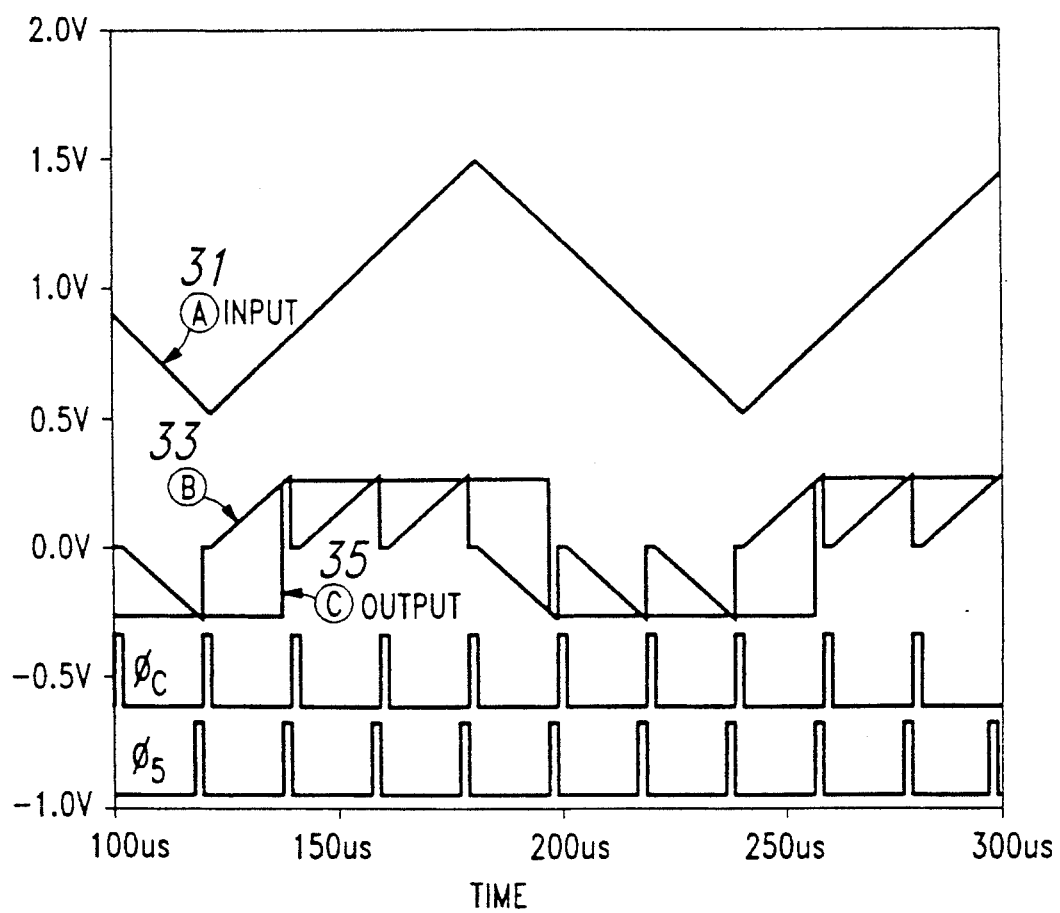
FIG. 4 is a timing diagram showing an input triangular wave at node 31 and the voltage at nodes 33 and 35 with reference to time.

The triangular wave input is placed at node 31. During clamp time $\phi_c$ with switch 23 being closed, node 33 is connected to $V_{DC}$ as can be see in FIG. 3 and the voltage at node 33 will immediately go to $V_{DC}$ (which is zero volts in the example provided). When switch 23 is then opened as shown by the $\phi_c$ curve in FIG. 3 at negative voltage, node 33 tracks the input at node 31, but at a different DC level. The DC level shift is exactly the input of the prior cycle, which is stored across capacitor 21. In this manner, the input from the prior cycle is subtracted from the current input. In the present example, as can be seen in FIG. 4, the input triangular wave at node 31 drops for one cycle, then rises for three cycles and then falls for three cycles. As the end of a cycle approaches, but just prior thereto, the $\phi_s$ switch 27 closes while the switch 23 is open and causes node 35 to track node 33 (since node 33 is tracked by the output of amplifier 25). When switch 27 opens after a short time and before switch 23 closes, the voltage on node 33 is held on node 35 for the rest of the cycle. Once switch 27 opens, the multiplex switches 7 of FIG. 1 will all close in sequence before the next bit of data is held in the capacitors 29. Node 35 now contains a square wave with the same period as the input triangular wave. Note that the output is negative when the input is decreasing (sloping down) and the output is positive when the input is increasing (sloping up).

The above action takes place in each circuit 13, 15, 17, 19 of the system serially without time overlap. During the next cycle of operation, the above described procedure is repeated.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A signal processing method which comprises the steps of:
   (a) providing a first capacitor having upstream and downstream electrodes;
   (b) applying a predetermined constant voltage source to said downstream electrode;
   (c) then removing said constant voltage source from said downstream electrode and applying an input signal to said upstream electrode;
   (d) providing a signal storage device;
   (e) storing the input signal on said downstream electrode at said first capacitor by coupling said signal storage device to and uncoupling said signal storage device from said downstream electrode; and
   (f) again applying said predetermined constant voltage source to said downstream electrode subsequent to said uncoupling of said signal storage device from said downstream electrode and then removing said constant voltage source from said downstream electrode.

2. The method of claim 1 wherein said signal storage device is a second capacitor.

3. The method of claim 2 further including the step of applying said input signal to said upstream electrode subsequent to step (f).

4. The method of claim 1 further including the step of applying said input signal to said upstream electrode subsequent to step (f).

5. The system of claim 1 wherein said system is disposed on a single semiconductor chip.

6. A signal processing system comprising:
   (a) a first capacitor having upstream and downstream electrodes;
   (b) means for periodically applying a predetermined constant voltage source to said downstream electrode and then removing said constant voltage source from said downstream electrode;
   (c) means for applying an input signal to said upstream electrode;
   (d) a signal storage device for storing said input signal on said downstream electrode at said first capacitor;
   (e) coupling means for periodically coupling said signal storage device to and uncoupling said signal storage device from said downstream electrode a predetermined time after said constant voltage source has been removed from said upstream electrode.

7. The system of claim 6 wherein said means for periodically apply a predetermined constant voltage is a voltage source and a first controlled switch periodically coupling said voltage source to said downstream electrode.

8. The system of claim 6 wherein said means for applying an input signal to said upstream electrode is a photoresponsive device.

9. The system of claim 6 wherein said coupling means is a second controlled switch periodically coupling said signal storage device to said upstream electrode.

10. The system of claim 6 wherein said signal storage device is a capacitor.

11. The system of claim 10 wherein said means for periodically apply a predetermined constant voltage is a voltage source and a first controlled switch periodically coupling said voltage source to said downstream electrode.

12. The system of claim 11 wherein said means for applying an input signal to said upstream electrode is a photoresponsive device.

13. The system of claim 12 wherein said coupling means is a second controlled switch periodically coupling said signal storage device to said upstream electrode.

14. The system of claim 13 wherein said system is disposed on a single semiconductor chip.

15. A focal plane array detector system comprising:
   (a) a plurality of detector circuits, each of said detector circuits comprising:
      (i) a first capacitor having upstream and downstream electrodes;
      (ii) means for periodically applying a predetermined constant voltage source to said downstream electrode and then removing said constant voltage source from said downstream electrode;
      (iii) a photodetector for applying an input signal to said upstream electrode;
      (iv) a signal storage device for storing said input signal on said downstream electrode at said first capacitor; and
      (v) coupling means for periodically coupling said signal storage device to and uncoupling said signal storage device from said downstream electrode a predetermined time after said constant voltage source has been removed from said upstream electrode; and
   (b) a multiplex circuit coupled to each of said signal storage devices for providing a serial output of the signals stored on said signal storage devices.

16. The system of claim 15 wherein said system is disposed on a single semiconductor chip.

* * * * *